United States Patent
Tourai

(10) Patent No.: US 6,784,887 B1
(45) Date of Patent: Aug. 31, 2004

(54) IMAGE PROCESSING DEVICE

(75) Inventor: Yutaka Tourai, Toyohashi (JP)

(73) Assignee: Minolta Co., Ltd., Osaka (JP)

(*) Notice: Subject to any disclaimer, the term of this patent is extended or adjusted under 35 U.S.C. 154(b) by 0 days.

(21) Appl. No.: 09/556,295

(22) Filed: Apr. 24, 2000

(30) Foreign Application Priority Data

Apr. 27, 1999  (JP) .......................................... 11-120476

(51) Int. Cl.⁷ .............................................. G06F 15/00
(52) U.S. Cl. ...................... 345/501; 345/626; 345/647; 307/308; 307/307
(58) Field of Search .................................. 345/501, 503, 345/520, 545, 626, 646, 647; 382/283, 307, 308, 260, 264

(56) References Cited

U.S. PATENT DOCUMENTS

| | | | | |
|---|---|---|---|---|
| 5,615,391 A | * | 3/1997 | Klees | 710/19 |
| 5,629,984 A | * | 5/1997 | McManis | 380/54 |
| 5,801,697 A | * | 9/1998 | Parikh et al. | 345/790 |
| 5,963,246 A | * | 10/1999 | Kato | 348/14.09 |
| 6,477,239 B1 | * | 11/2002 | Ohki et al. | 379/52 |
| 6,483,570 B1 | * | 11/2002 | Slater et al. | 355/40 |

FOREIGN PATENT DOCUMENTS

JP    9-223250    8/1997

* cited by examiner

*Primary Examiner*—Ulka J. Chauhan
(74) *Attorney, Agent, or Firm*—McDermott, Will & Emery

(57) ABSTRACT

Image data are obtained from a recording medium, and dummy image data are generated based on the obtained image data. It is possible to switch between image displayed based on the generated dummy image data, and image data directly displayed based on the obtained image data. As a result, the dummy image may be displayed when a third party is near. Furthermore, the displayed dummy image can be used for editing, and the edited image may be printed.

13 Claims, 6 Drawing Sheets

IMAGE PROCESSING DEVICE

RELATED APPLICATIONS

This application is based on Patent Application No. 11-120476 filed in Japan, the entire content of which is hereby incorporated by reference.

BACKGROUND OF THE INVENTION

1. Field of the Invention

The present invention relates to an image processing device provided with a display unit for displaying an image.

2. Description of the Related Art

Recent years have seen improve processing capabilities is of information processing devices such as personal computers (hereinafter referred to as "PC") and the like. As a result, enormous amounts of data such as image data can be processed and printed by a PC. Recent years have also seen the popularization of devices which produce image data such as digital cameras, scanners, film scanners and the like. Image data produced by these devices are increasingly stored on recording (storage) media such as smart media™, compact flash™ and the like.

Various modes of handling image data produced by digital cameras are described below. Consider image processing devices capable of self-service printing of images based on image data stored on recording media at locations used by many general users, e.g., on streets, storefronts, and within shops. As an example of the exterior of such an image processing device, consider a table-top game machine provided with a display screen and operation buttons, and further provided with a slot for inserting the recording media.

The user of such an image processing device inserts a recording medium she brings with her into the slot, and the image data are read by the device. After verifying an image displayed on the display screen based on the read data, the user specifies that the image should be printed. The device receives the print instruction, and forms and outputs the image on a sheet of appropriate size.

In the aforesaid image processing device, however, the image displayed on the screen may be seen by a third party. In this instance, it is possible that a user may be reluctant to use the device if a third party has access to the image.

A private room for the installation of the device has been considered as a solution to the aforesaid disadvantage. However, a private room increases the cost of installation, and such an installation is undesirable in public areas since such a room is difficult to monitor.

SUMMARY OF THE INVENTION

An object of the present invention is to provide is to eliminate the previously described disadvantages.

A further object of the present invention is to provide an image processing device which prevents image displayed on a display device from being viewed by a third party.

These and other objects are attained by an image processing device having, a receiving unit for receiving original image data, a memory for storing dummy image data, a display for displaying an image, and a selector for selecting to display an original image on the display based on the original image data or to display a dummy image on the display based on the dummy image data.

The aforesaid objects of the present invention are further attained by an image processing device comprising an image processing device having, a receiving unit for receiving original image data, a generator for generating dummy image data based on the original image data, a display for displaying an image, and a selector for selecting to display an original image on the display based on the original image data or to display a dummy image on the display based on the dummy image data.

The invention itself, together with further objects and attendant advantages, will best be understood by reference to the following detailed description taken in conjunction with the accompanying drawings.

BRIEF DESCRIPTION OF THE DRAWINGS

In the following description, like parts are designated by like reference numbers throughout the several drawings.

DETAILED DESCRIPTION OF THE PREFERRED EMBODIMENTS

The image processing device of the present invention is described hereinafter with reference to the accompanying drawings.

First Embodiment (1) General Construction of the Image Processing Device

Figure 1:
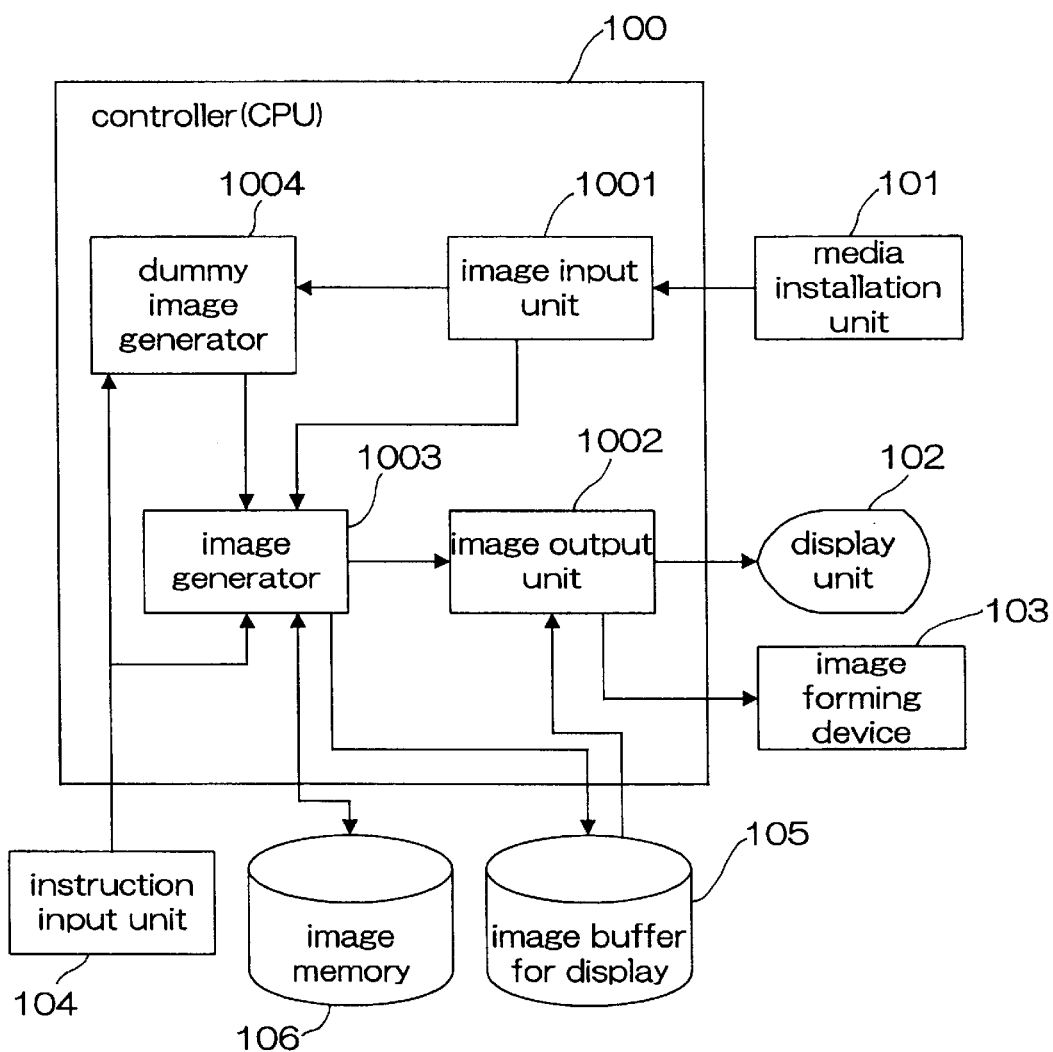
FIG. 1 is a function block diagram showing the general construction of the image processing device.

FIG. 1 is a function block diagram showing the general construction of the image processing device.

As shown in the same drawing, the image processing device comprises a media installation unit 101, display 102, image forming unit 103, instruction input unit 104, display image buffer 105, and an image memory 106, each of which is connected to a controller 100. The controller 100 comprises an information processor with a CPU as its core, and includes an image input unit 1001, image output unit 1002, image generator 1003, and a dummy image generator 1004. Each function is realized by executing programs via the CPU.

The media installation unit 101 may be, for example, a floppy disk drive for reading data from a floppy disk. Another disk reading device also may be provided so as to read image data recorded on a recording medium (e.g., smart media™, compact flash™, CD, MO, DVD and the like). Image data recorded on a recording medium installed in the media installation unit 101 are transmitted to the image input unit 1001 of the controller 100.

The image corresponding to the image data is displayed on the display unit 102 via the image output unit 1002. A display device such as a liquid crystal display (LCD) CRT display and the like may be used. On the other hand, the image forming unit 103 has the function of forming an image on a print medium such as a paper sheet or the like based on the image data. Specifically, various types of image forming devices may be used, e.g., a sublimation printer, inkjet printer, laser printer and the like.

Figure 2:
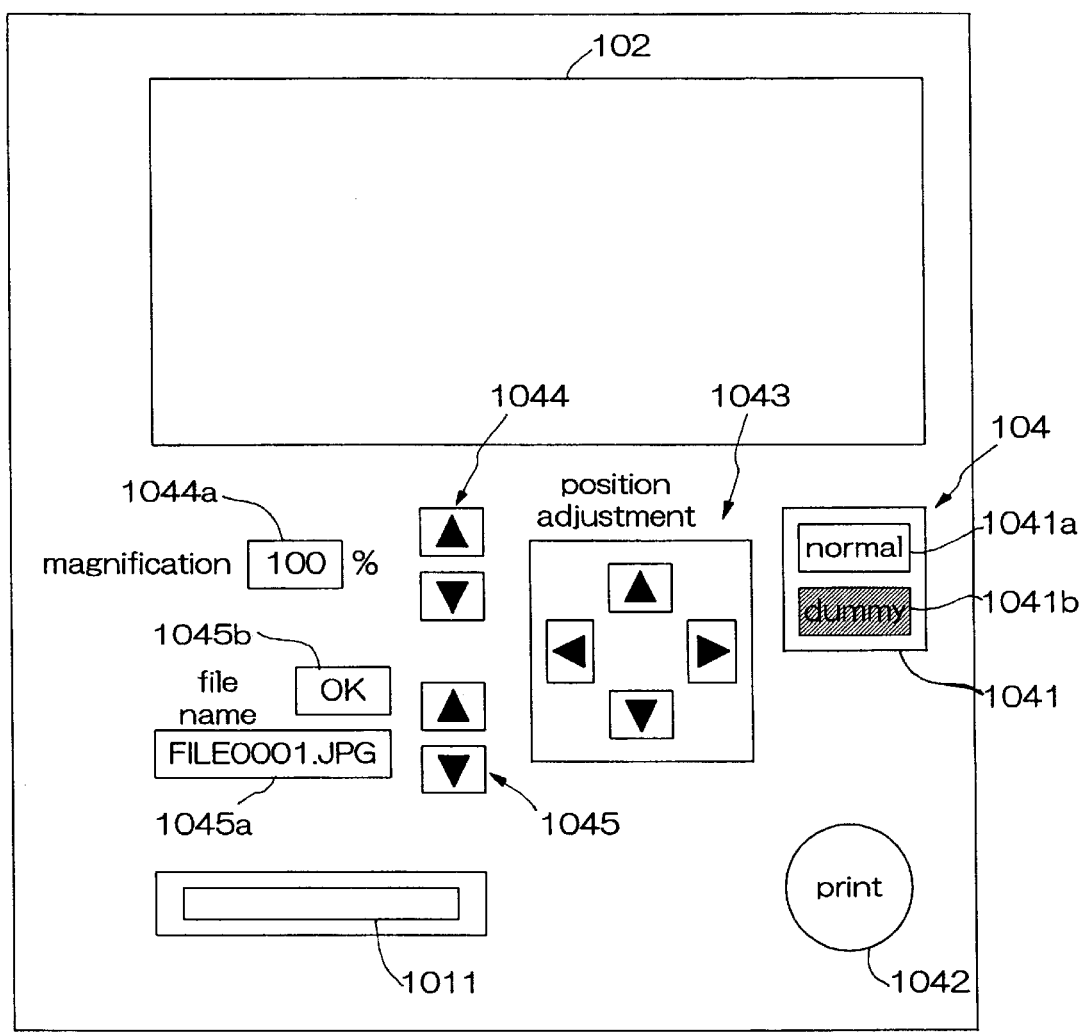
FIG. 2 shows the instruction input unit 104.

The instruction input unit 104 is an input device for receiving instructions input by a user. FIG. 2 shows an exterior view of a device incorporating the instruction input device 104. In the same drawing, a series of operation buttons and a display comprising the instruction input unit 104 are provided directly below the screen of the display unit 102. Instructions input by a user from the instruction input unit 104 are transmitted to the controller 100. The various parts of the instruction input unit 104 are described below.

Item 1041 is a mode specification button for specifying the operation mode of the image processing device. The mode specification button 1041 includes a normal mode button 1041*a* and dummy mode button 1041*b*. Since the normal mode is usually used, the normal mode button 1041*a* is lighted, but when the dummy mode button 1041*b* is pressed, the dummy mode button 1041*b* is lighted.

The dummy mode button 1041*b* is pressed when specifying a mode wherein an image input to the image processing device is not directly displayed on the display unit 102 (hereinafter referred to as "dummy mode"), the input image being, specifically, an image (hereinafter referred to as "input image") based on image data (hereinafter referred to as "input data") stored on a recording medium inserted into the media slot 1011 for receiving recording media provided on the media installation unit 101. When the dummy mode is specified, the input image is not directly displayed on the display unit 102 (hereinafter, the image displayed on the display unit 102 is referred to as the "display image," and the image data comprising the display image are referred to as "display data"), and another image is displayed rather than the input image (hereinafter, this other image is referred to as the "dummy image," and the image data comprising the dummy image are referred to as "dummy data"). The generation of the dummy data is described later. In the normal mode, the input image is directly displayed on the display unit 102.

Below the mode specification button 1041 is provided a print button 1042; when the print button 1042 is pressed, an image is formed based don either the input image data or adjusted image data of the input data (hereinafter, the image data used for image formation are referred to as "print data"). The sheet on which the image is formed is output from an ejection port not shown in the illustration.

The position adjustment button 1043 comprises four vertical/horizontal arrow buttons, and is used to adjust the display position of the display image on the screen of the display device 102. When the image position is changed by the position adjustment button 1043, the position of the image printed on the sheet is also changed in correspondence therewith.

The magnification specification key 1044 is used to adjust the size of the display image on the display unit 102, and specifically specifies the magnification of the display image relative to the size of the input image. The magnification of the image printed on the sheet is changed based on the magnification specified by the magnification specification button 1044. The magnification specification button 1044 includes two up/down arrow buttons, such that enlargement is specified by pressing the up arrow, and reduction is specified by pressing the down arrow. The specified magnification is displayed on a magnification display 1044*a* for verification. Although enlargement and reduction of an image is accomplished based on the position of the top left frame of the image, the present invention is not limited to this arrangement inasmuch as another position, e.g., the center, bottom left, or top right frames of the image may be used as reference. The reference position of enlargement and reduction may be changed depending on the image disposition position.

Item 1045 is a file name specification button. This button is effective when a recording medium such as a floppy disk is inserted in the media slot of FIG. 2. The names of a files recorded on an inserted recording medium are sequentially scrolled on the file name display 1045*a* by operating the up/down arrow buttons. When the OK button 1045*b* is pressed after file name selection, the image data recorded in the file are transmitted to the image input unit 1001 as input data, and stored in the image memory 106 via the image generator 1003. When the selected file does not contain image data, an error message may be displayed.

Each part of the controller 100 is described below. The image input unit 100 fetches image data from the media installation unit 101, and transmits the data to the image generator 1003 or the dummy image generator 1004.

The image output unit 1002 displays on the display 102 an image based on the display data stored in the display image buffer 105, and the image forming device 103 forms an image based on the print data transmitted from the image generator 1003.

The image generator 1003 adjusts the position and magnification of the display image based on user specifications, this adjustment being performed on the dummy data generated by the dummy image generator 1004 in the dummy mode, or performed on the input data stored in the image memory 106 in the normal mode, and stores the data in the display image buffer 105. The image generator 1003 transmits print data reflecting the position and magnification adjustments when the print button 1042 is pressed. Since the dummy data are not used when the image is actually formed, the print data are normally the image data (i.e., image data stored in the image memory 106) reflecting the position and magnification adjustment in the input data.

The dummy image generator 1004 generates dummy data for the dummy image displayed on the display unit 102 when the dummy mode is specified. An image of one color of the input image and maintaining the shape and size of the input image, specifically, information of the number of pixels vertically and horizontally, is used as the dummy image. Since the number of vertical and horizontal pixels of the input image can be readily determined from the input data, the dummy image generator 1004 generates the dummy data based on such information. Accordingly, if the input image is square in shape, the number of pixels vertically and horizontally are identical, and, for example, a square image gray in color (any color is acceptable) is supposed, and corresponding dummy data are generated.

Figure 3A:
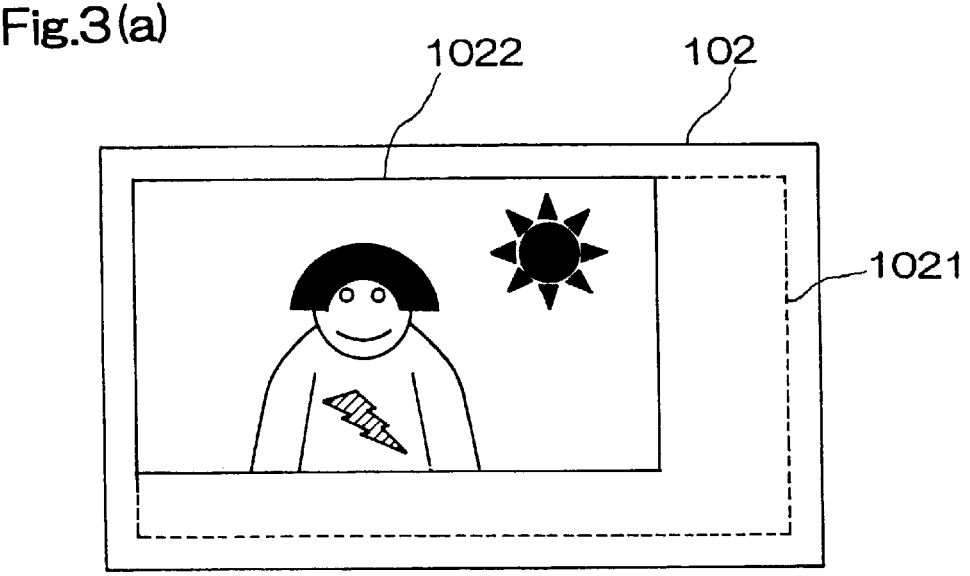
FIG. 3(a) shows the display unit 102 in the normal mode.
Figure 3B:
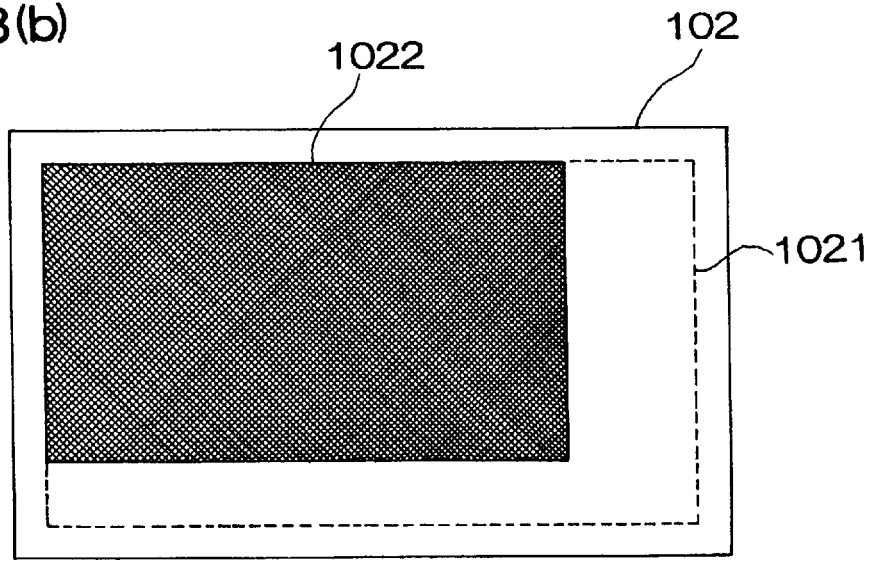
FIG. 3(b) shows the display unit 102 in the dummy mode.

FIG. 3 shows an example of a display image when the normal mode and the dummy mode are specified. FIG. 3(*a*) shows an example of the display image in the normal mode, and FIG. 3(*b*) shows an example of the display image in the dummy mode.

In FIG. 3(*a*), the size of the region 1021 (hereinafter referred to as the "display region") in which the image is actually displayed on the screen of the display unit 102 corresponds to the size of the sheet used for printing, and the size of the display image 1022 is the size of the basic input image determined from the resolution or pixel density of the input data. In FIG. 3(*a*), the input image is displayed with the position of the top left of the display region 1021 as a reference, and is actually smaller than the print sheet used, such that there is an imbalance of excess white area surrounding the printed image. The user determines the size and relative position of the image and print sheet when actually printing by adjusting the size and position of the display image displayed on the display unit 102 using the position adjustment button 1043 and the magnification button 1004. The reference position when displaying the input image on the screen in the initial state is not limited to the top left of the screen as indicated in FIG. 3.

The adjustment of the position and size can be similarly accomplished in the dummy mode. That is, in the initial state (i.e., the state wherein there has been no position or size adjustment), the position and size of the input image and the dummy image are displayed as equal, as shown in FIG. 3(*b*).

In either operation mode, adjustment of the display position and size of the display image by the user via the instruction input unit 104 is reflected in the display data and print data via the image generator 1003, and displayed on the display unit 102 and formed as an image via the image formation device 103.

(2) Processing Content of the Controller 100

Figure 4:
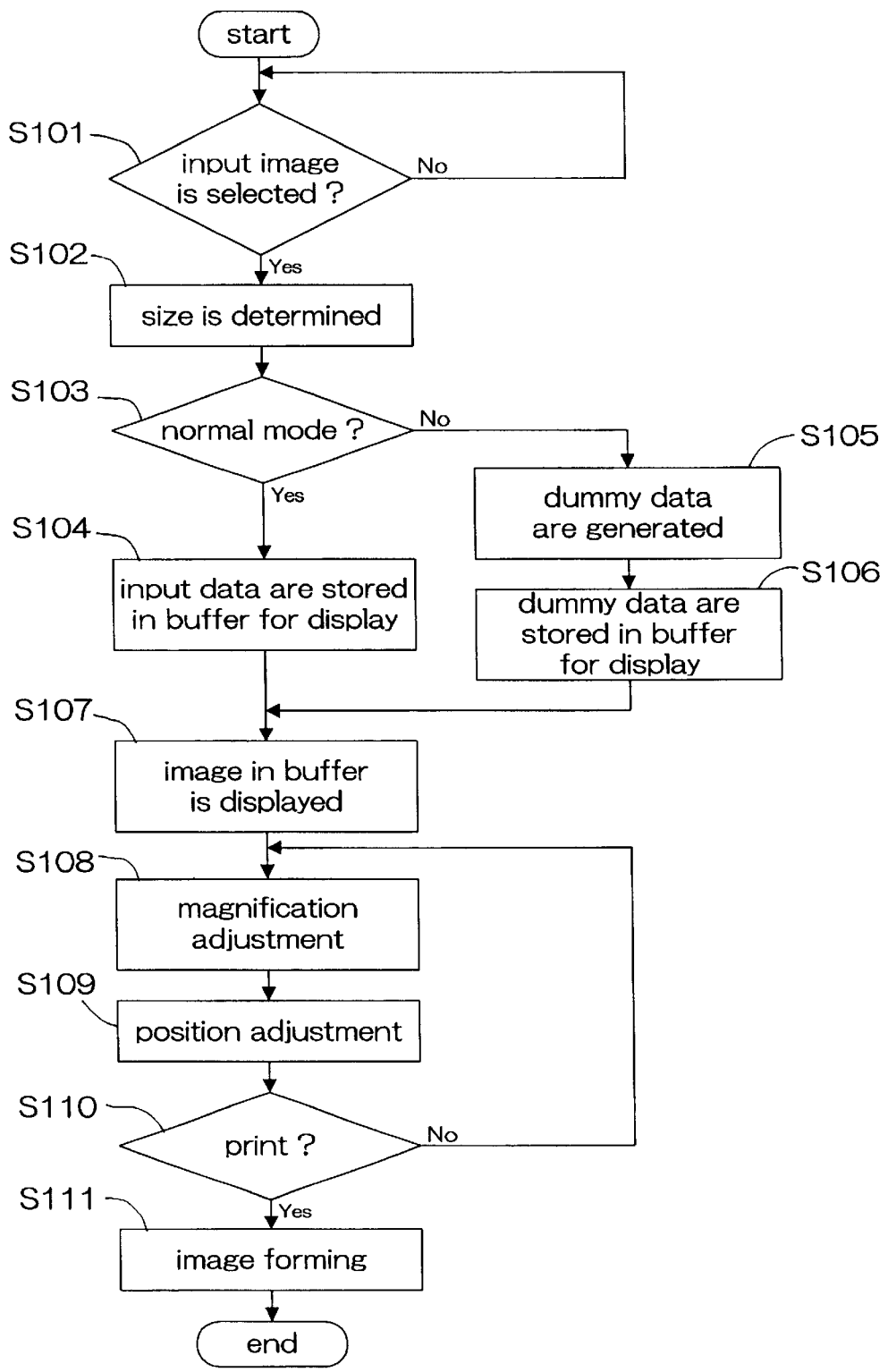
FIG. 4 is a flow chart showing the process content (first embodiment) of the controller 100.

The processing content of the controller 100 is described below. FIG. 4 is a flow chart showing the process content of the controller 100. The controller 100 receives the insertion of the recording medium in the media slot 1011, and the file name selection corresponding to the input image (S101: YES), then determines the size of the input image from the input data (S102). The size of the input image can be readily determined from the resolution or the pixel density of the input data.

Then, a determination is made as to whether the operation mode is the normal mode, or the dummy mode (S103). In the normal mode (S103: YES), the input data stored in the image memory 106 are stored directly in the display image buffer 105 as display data (S104). In the dummy mode, however (S103: NO), dummy data are generated according to the previously described method (S105), and the generated dummy data are stored in the display image buffer 105 as display data (S106).

Thereafter, a display image based on the display data stored in the display image buffer 105 is displayed on the display unit 102 (S107), and the user adjusts the image via specifications set by the image magnification adjustment (S108) and position adjustment (109). The result of this adjustment process is reflected in the image data stored in the image memory 106 and the display data stored in the display image buffer 105. When the print button 1042 is pressed without any adjustments being made, the processes of steps S108 and S109 are omitted since there are times these processes are performed and times they are not. When the print button has not been pressed (S110: NO), the magnification adjustment and position adjustment may be performed any number of times.

When the print button 1042 has been pressed (S110: YES), the image generator 1003 outputs the print data stored in the image memory 106, and the image output unit 1002 specifies image formation on paper to the image forming device 103 (S111).

Since the print data reflect the adjustments to position and size made to the input data, in the image forming process the input image is formed reflecting the adjustments to the forming position and size on a sheet of predetermined size.

If the aforesaid image forming device is used, the input image cannot be viewed by a third party even when the adjustment process for making the image magnification and position adjustments requires a certain amount of time.

Second Embodiment

A second embodiment is described below. In the first embodiment, an image of monochrome and the same aspect and size as the input image is used as the dummy image. However, various images can be used as the dummy image. In the second embodiment, an image of extracted outline or an image converted to mosaic pattern is used as the dummy image.

Figure 5:
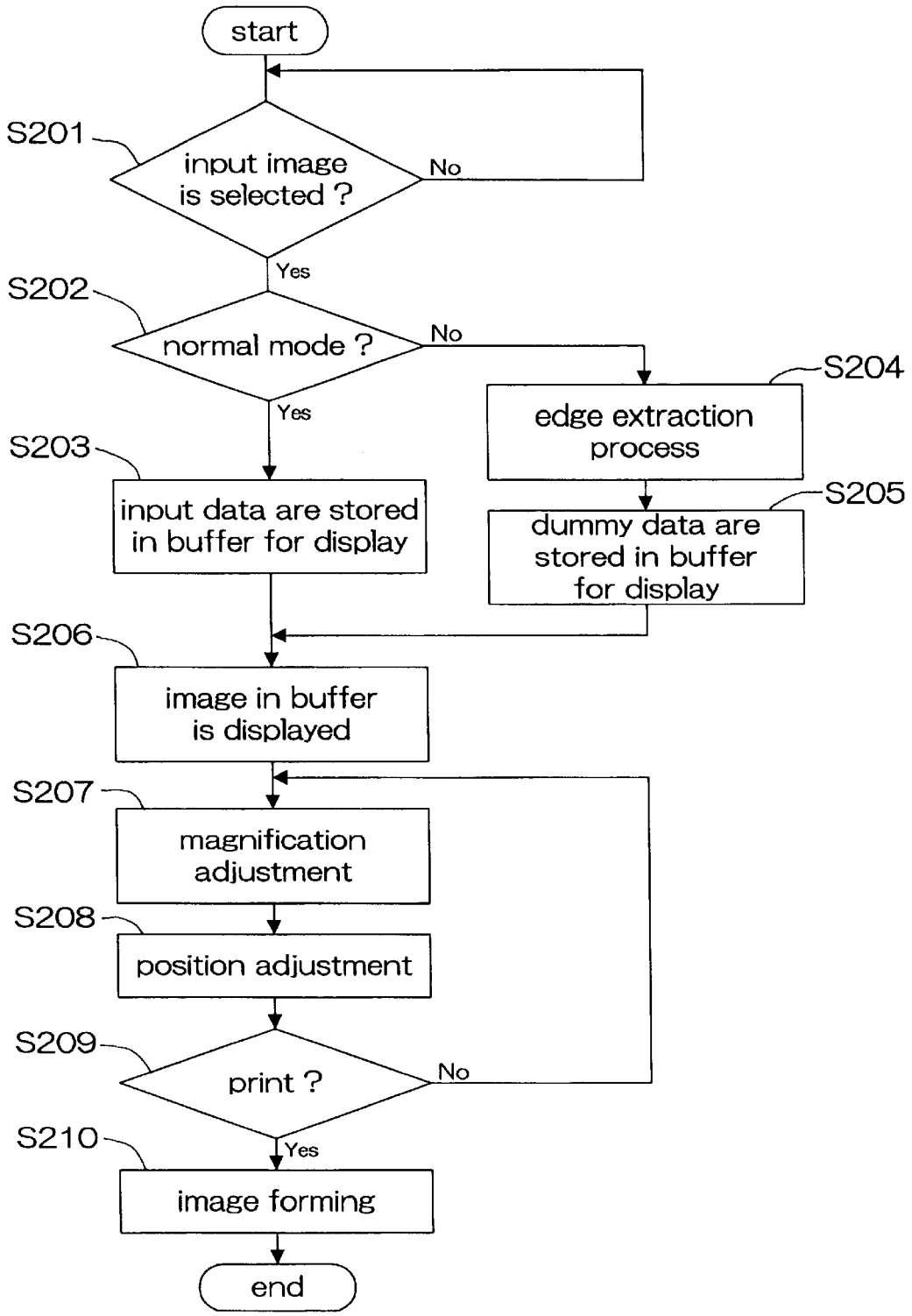
FIG. 5 is a flow chart showing the process content (second embodiment) of the controller 100.

FIG. 5 is a flow chart of the process content of the controller 100. The process content of the second embodiment is substantially similar to that of the first embodiment. Points of difference are the determination of the size of an image is not initially required when an input image is selected (S201: YES) (refer to step S102 in FIG. 2), and an edge extraction process is executed as the dummy image generation process (S204).

Figure 6A:
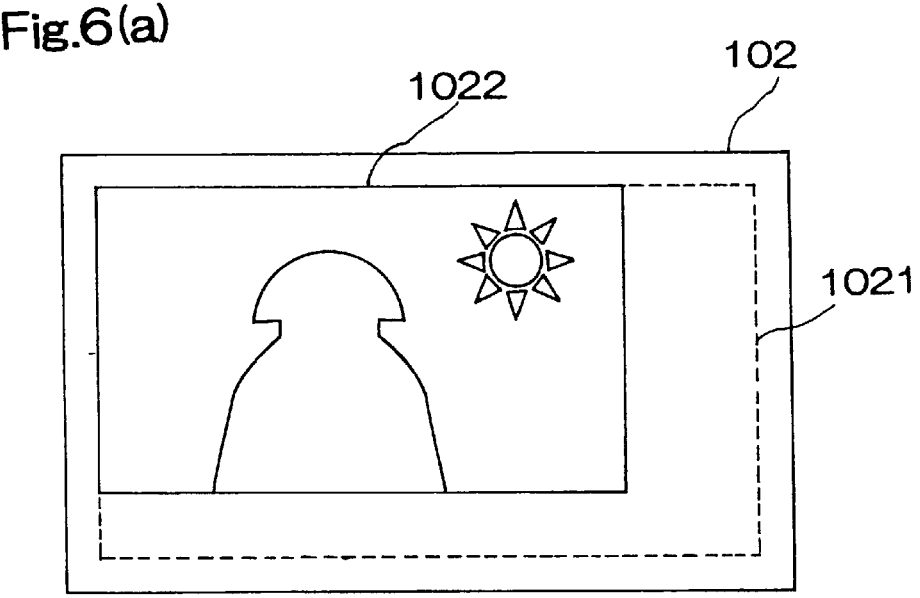
FIG. 6(a) shows the display unit 102 in the dummy mode (second embodiment)
Figure 6B:
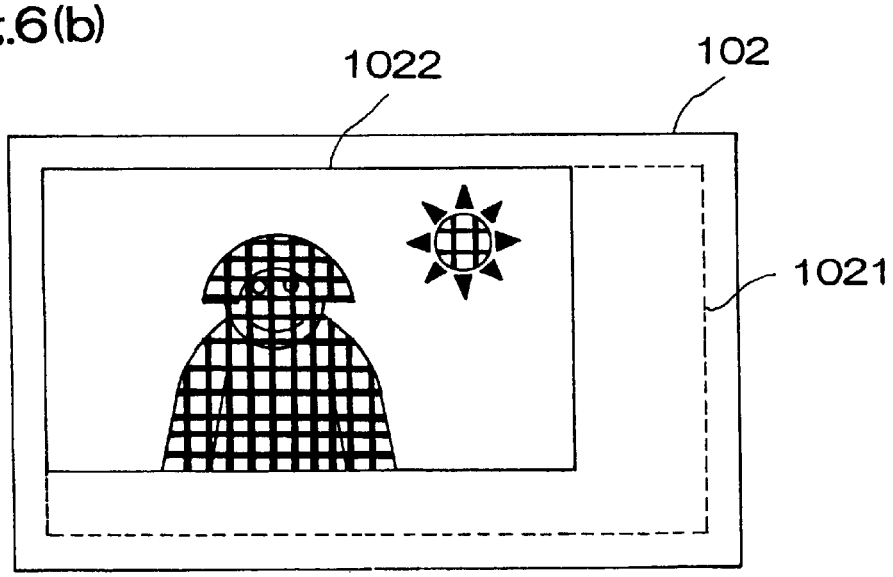
FIG. 6(b) shows the display unit 102 in the dummy mode (second embodiment.)

The edge extraction process (S204) is a process for extracting the outline of the input image. When the edge extraction process is performed, the dummy image is an image of only an emphasized outline, as shown in FIG. 6(*a*). The edge extraction process itself is a well known image process and, therefore, a detailed description of the process is omitted.

A conversion to a mosaic pattern may be used as an alternative to the edge extraction as the dummy image generation process. A mosaic display of a dummy image is shown in FIG. 6(*b*). In this instance, a mosaic process may be used in place of the edge extraction process in step S204 of the flow chart of FIG. 5. Since the mosaic process is also a well known process, a detailed description of the process is omitted.

As described above, a third party can be prevented from viewing an input image even by the method of the second embodiment. For example, when the input image is the image of a person, the method of the second embodiment effectively allows the user to view the Figure of the person in the input image.

Modifications

Modifications of the previously described embodiments are described below.

(1) In the first embodiment, a monochrome image of monochrome and the same size and shape (e.g., square) as the input image is used as the dummy image in the dummy mode. However, an image completely unrelated to the input image, e.g., an image of a background, may be used as the dummy image. The purpose of using such an unrelated image is to prevent a third part from viewing the input image. Moreover, a simple dummy image such as that used in the first embodiment is desirable from the perspective of economizing on storage area by reducing the amount of data. On the other hand, when, for example, a user wants to verify the position of the image of a person, it is desirable to display a processed input image as in the second embodiment.

(2) When position adjustment and magnification adjustment of the input image is required, the shape and size of the dummy image is desirable the same shape and size as the input image. However, the present invention is not limited to this arrangement, inasmuch as the sizes and shapes may differ.

(3) Although the first and second embodiment have been described in terms of devices which do not have a specific function for combining an input image and bordering text and pattern (hereinafter referred to as "frame") prepared beforehand, image processing devices capable of combining an input image and the aforesaid frames and forming the resultant image on a sealed mounting paper have been installed at numerous locations in recent years. In the related image processing device, a user typically makes images using a camera and displays these images on a display means. However, these devices are often installed in places utilized by numerous unspecified users, such that the appearance of the image itself as well as the content of the selected frame and the like may be seen by third parties. In this instance, various modes may be used including converting the entire image after combination with a frame, and displaying the resultant image, and displaying only the Figure itself, e.g., a mosaic processed image.

(4) The aforesaid embodiments have been described in details supposing that the devices are installed in places utilized by numerous unspecified users. However, when adjusting the size and position of an image, the aspect of displaying a dummy image different from the present image photographed using, for example, a digital camera or the like may be applied to the image processing device belonging to an individual for personal use. For example, when editing text including an image using a personal computer used by an individual, a dummy image having a simple shape an pattern may be displayed immediately at the image display position, and the current image is used only when printing, thereby reducing the load on the CPU during the editing process, and allowing fast processing.

According to the previously described embodiments, an image masking area is provided in the course of the display process for displaying an input image or adjusted image data on a display screen, such that the content of the input image is substantially concealed when displayed on the display screen when non-display of the input image is specified. As a result, the image processing device prevents a third party from seeing an image to be printed even when the device is in stalled in a place utilized by numerous unspecified users.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing device comprising:
   a receiving unit for receiving original image data;
   a memory for storing dummy image data;
   a display for displaying an image; and
   a selector for selecting for continuous display on the display either an original image based on the original image data or a fixed dummy image based on the dummy image data, the dummy image being a complete replacement for the original image, wherein after either the original image or the dummy image is selected for display, the image that is not selected is not displayed on the display.

2. An image processing device as claimed in claim 1, wherein the dummy image has no relation to the original image with respect to a meaning of an image.

3. An image processing device as claimed in claim 1, wherein the dummy image data is generated based on the original image data.

4. An image processing device as claimed in claim 3, wherein the dummy image has a characteristic of the original image.

5. An image processing device as claimed in claim 3, wherein the dummy image has a same size as the original size.

6. An image processing device as claimed in claim 3, further comprising a slot for receiving a storage media, and wherein the receiving unit receives the original image data from the storage media set in the slot.

7. An image processing device comprising:
   a receiving unit for receiving original image data;
   a generator for generating dummy image data based on the original image data;
   a display for displaying an image; and
   a selector for selecting to display an original image on the display based on the original image data or to display a dummy image on the display based on the dummy image data, wherein
      the generator includes a mosaic process to provide a dummy image that is an image of only a mosaic pattern filling an outline of each image of the original image.

8. An image processing device comprising:
   a receiving unit for receiving original image data;
   a generator for generating dummy image data based on the original image data;
   a display for displaying an image; and
   a selector for selecting to display an original image on the display based on the original image data or to display a dummy image on the display based on the dummy image data, wherein
      the generator includes an edge extraction process to provide a dummy image that is an image of only an emphasized outline of each image of the original image.

9. An image processing device as claimed in claim 7, wherein the generator includes a masking process.

10. An image processing device as claimed in claim 7, further comprising a slot for receiving a storage media, and wherein the receiving unit receives the original image data from the storage media set in the slot.

11. An image processing device comprising:
    a receiving unit for receiving original image data;
    a generator for generating dummy image data based on the original image data;
    a display for displaying a dummy image on the display based on the dummy image data;
    an editor for editing the original image with displaying the dummy image and getting edited image data from the original image data; and
    an output unit for outputting the edited image data.

12. An image processing device as claimed in claim 11, further comprising a printer for printing an image based on the outputted image data from the output unit.

13. An image processing device as claimed in claim 11, further comprising a slot for receiving a storage media, and wherein the receiving unit receives the original image data from the storage media set in the slot.

* * * * *